United States Patent [19]

Seeling et al.

[11] 4,046,867
[45] Sept. 6, 1977

[54] METHOD FOR MAKING SULFUR DIOXIDE-CONTAINING GAS STREAM

[75] Inventors: Philip F. Seeling, North Syracuse; Samuel L. Bean, Jamesville, both of N.Y.

[73] Assignee: Allied Chemical Corporation, Morris Township, N.J.

[21] Appl. No.: 552,822

[22] Filed: Feb. 25, 1975

[51] Int. Cl.² .............. C01B 17/54; C01B 17/48; B01D 47/02
[52] U.S. Cl. .............. 423/543; 55/73; 423/539
[58] Field of Search .............. 55/73; 423/539, 543

[56] References Cited

U.S. PATENT DOCUMENTS

| 1,314,634 | 9/1919 | Collins | 55/73 |
|---|---|---|---|
| 1,469,959 | 10/1923 | Richter et al. | 423/543 |
| 2,413,714 | 1/1947 | Keeling | 423/576 |
| 2,598,116 | 5/1952 | Du Bois | 55/73 |
| 2,726,933 | 12/1955 | Merrian et al. | 423/543 |
| 2,780,307 | 2/1957 | Macafee | 55/73 |
| 3,403,496 | 10/1968 | Ahlander et al. | 423/543 |

Primary Examiner—O. R. Vertiz
Assistant Examiner—Gary P. Straub
Attorney, Agent, or Firm—Gerhard H. Fuchs; Gerard P. Rooney

[57] ABSTRACT

Improvement in the method for making a sulfur dioxide-containing gas stream of low elemental sulfur content by contacting a stream of oxygen-containing gas with elemental sulfur maintained above its auto-ignition temperature to generate a gas stream containing sulfur dioxide and gaseous elemental sulfur, followed by contacting this gas stream with liquid elemental sulfur maintained below its auto-ignition temperature, which improvement involves subsequently scrubbing the gas stream in a confined area with water or an aqueous medium, preferably containing small amounts of ammonia, under conditions of turbulent flow to obtain a sulfur dioxide-containing gas stream substantially free of oxygen and sulfur trioxide and containing less than about 0.0002 lb. of sulfur per cubic foot of gas, measured at standard conditions.

4 Claims, 1 Drawing Figure

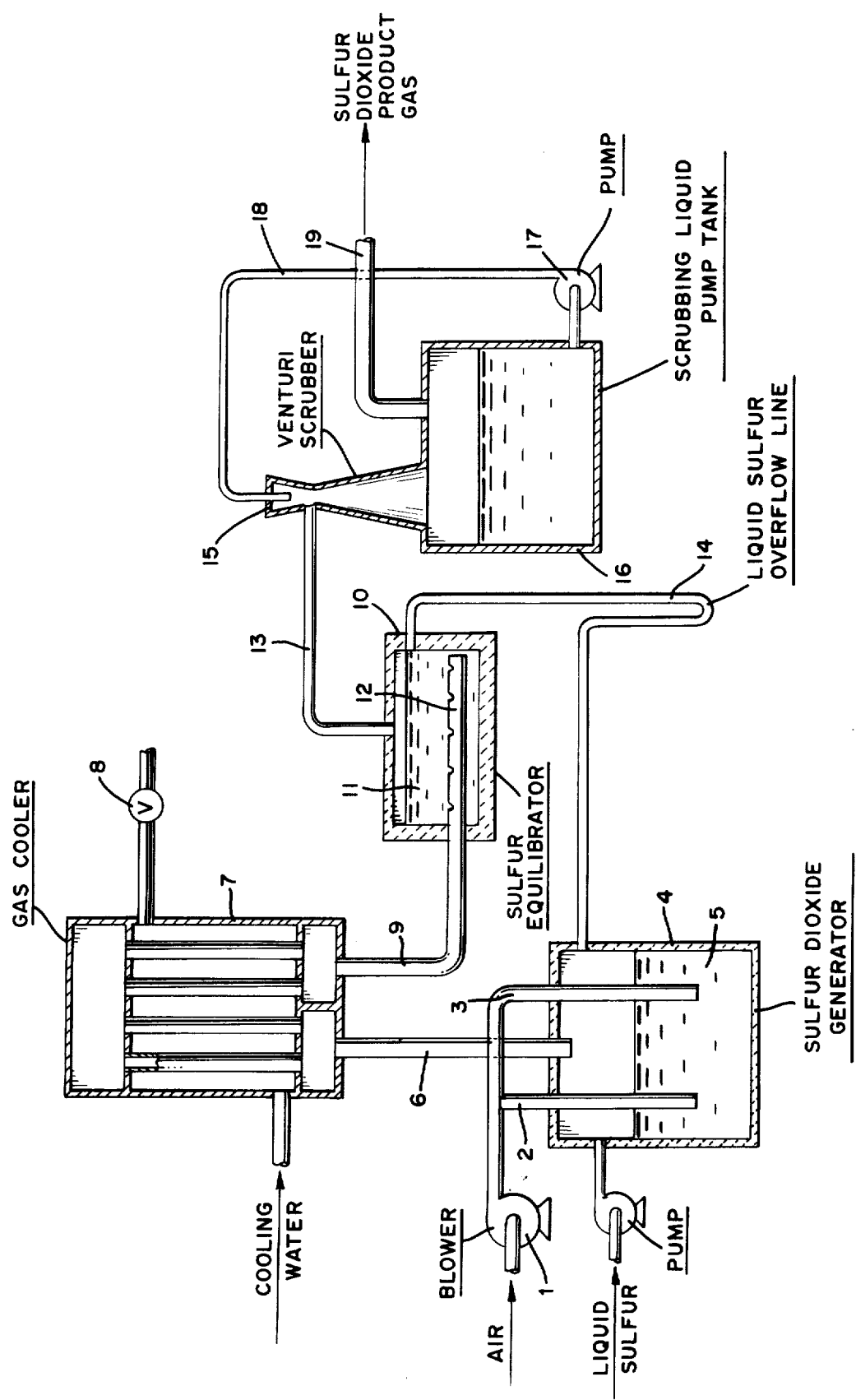

METHOD FOR MAKING SULFUR DIOXIDE-CONTAINING GAS STREAM

BACKGROUND OF THE PRESENT INVENTION

Combustion of elemental sulfur in air or in an oxygen-containing gas stream is a convenient method for generating sulfur dioxide. However, combustion of liquid sulfur effected within a body of the same results in a stream of gaseous product heavily laden with vaporized elemental sulfur. High elemental sulfur content of such gases makes them unsuitable for bleaching or other processes wherein substantially sulfur-free sulfur dioxide is desired or required. Moreover, the vaporized sulfur tends to deposit as liquid or solid upon surfaces of equipment, creating or aggravating operational and design difficulties.

U.S. Pat. No. 2,726,933 to Merriam et al. describes a method for making sulfur dioxide-containing gas streams substantially free of oxygen and sulfur which involves contacting an oxygen-containing gas stream with liquid sulfur maintained at auto-ignition temperature (at about 500° F. or above) within a reaction zone comprising a pool of molten sulfur. The resultant gases comprising sulfur dioxide and vaporous sulfur are contacted further with liquid sulfur having temperature below auto-ignition, for time and under conditions adequate to substantially reduce the temperature of those gases to obtain a sulfur dioxide-containing gas stream substantially free of oxygen and free sulfur. Merriam et al. found that if in the second step the gases are cooled to temperature below minimum auto-ignition temperature of the sulfur, by about 200° F. or more, then their sulfur content may be nil for practical purposes. The sulfur dioxide-containing gas stream obtained by the method of Merriam et al. is sufficiently free of elemental sulfur for use in bleaching or reduction of paper or other cellulose material, or for exothermic reaction with hydrogen sulfide to produce elemental sulfur.

However, we have found that when a sulfur dioxide-containing gas stream made in accordance with Merriam et al.'s method is used for making sodium sulfite by contacting an aqueous sodium carbonate or hydroxide solution with the sulfur dioxide-containing gas stream, then the sodium sulfite product always contains as impurity elemental sulfur or significant amounts of sodium thiosulfate as a result of reaction of initially formed sodium sulfite with traces of residual elemental sulfur contained in the gas stream. Further investigation showed that Merriam et al.'s method is incapable of consistently producing a sulfur dioxide-containing gas stream containing less than about 0.0002 lb. of sulfur per cubic foot of gas, measured at standard conditions. While that sulfur level is sufficiently low for most applications wherein a sulfur dioxide-containing gas stream is required having low oxygen and sulfur contents, that already low sulfur content is still not sufficiently low if the sulfur dioxide is to be used for making photographic grade sodium sulfite and sodium metabisulfite.

Accordingly, it is an object of the present invention to improve the process disclosed by Merriam et al. to further reduce sulfur content of the sulfur dioxide-containing gas stream made in accordance with that process.

SUMMARY OF THE INVENTION

In accordance with the present invention, there is provided an improvement in the method for generating a sulfur dioxide-containing gas stream of low elemental sulfur content involving the steps of contacting a stream of oxygen-containing gas with elemental sulfur maintained at temperature of at least about 500° F. to generate a gas stream comprising sulfur dioxide and gaseous elemental sulfur, followed by contacting said gas stream with elemental sulfur maintained at temperature from about 240° F. to 310° F. to obtain a gas stream low in oxygen and elemental sulfur, which improvement comprises contacting said gas stream low in oxygen and elemental sulfur in a confined area with water or an aqueous medium under conditions of turbulent flow and recovering a sulfur dioxide-containing gas stream substantially free of oxygen and sulfur trioxide and containing less than about 0.0002 lb. of sulfur per cubic foot of gas, measured at standard conditions, usually less than about 0.0001 lb. of sulfur per cubic foot of gas. Preferably, the water or aqueous medium contains small amounts of ammonia.

Desirably, the gas stream comprising sulfur dioxide and gaseous elemental sulfur is first subjected to cooling in an indirect heat exchanger to reduce its temperature to between about 240° and 310° F., and it is then contacted with elemental sulfur maintained at temperature from about 240° F. to about 310° F., but not above that of the cooled gas stream. Desirably, contacting of the gas stream low in oxygen and elemental sulfur with water or an aqueous medium under conditions of turbulent flow is effected in a venturi scrubber.

DETAILED DESCRIPTION OF THE INVENTION AN OF THE PREFERRED EMBODIMENTS

The process for generating a sulfur dioxide-containing gas stream disclosed by Merriam et al. in U.S.P. 2,726,933 essentially comprises two steps. In a first step, oxygen supplied in a stream of gas is brought into contact with liquid sulfur maintained at auto-ignition temperature within a reaction zone comprising a pool of molten sulfur. In a second step, the resultant gas stream comprising sulfur dioxide and elemental sulfur is further contacted with liquid sulfur having temperature below auto-ignition level for time and at other conditions adequate to substantially reduce the temperature of the gas stream. Merriam et al. found that, by employing in the second step liquid sulfur having temperature substantially below minimum auto-ignition temperature, say by about 200° F. or more below auto-ignition temperature, the elemental sulfur content of the gas stream may be nil for practical purposes. We believe the second step of the Merriam et al. process serves to approach vapor pressure equilibrium between the gaseous elemental sulfur in the gas stream and the liquid sulfur with which the gas stream is contacted. Since the vapor pressure of gaseous sulfur in equilibrium with molten sulfur decreases with decreasing temperature, employment of liquid sulfur having lowest possible temperature in the second step of Merriam et al.'s process should result in a sulfur dioxide-containing gas stream having lowest possible content of free sulfur. Although the melting point of elemental sulfur, which varies somewhat with the crystal form in which it is present, may be as low as about 238° F., we have found that, in order to prevent complications posed by solidification of sulfur within the processing equipment, lowest practical operating temperature in the second step of the Merriam et al. process is about 240° F. At that temperature the vapor pressure of the sulfur would correspond to free elemental sulfur content of gases in contact therewith of about 0.000025 lb. of sulfur per cubic foot of gas, measured at standard conditions. Surprisingly, our tests have shown that in the process of Merriam et al., employing sulfur at temperature of about 240° F. in the second step, sulfur carry-over in the resultant gas stream generally is in the order of about 0.0002 lb. of sulfur per cubic foot of gas, measured at standard conditions, and that it is not possible to consistently obtain sulfur dioxide-containing gas having sulfur content of less than about 0.0001 lb. of sulfur per cubic foot of gas, measured at standard conditions. Under no circumstances have we been able to obtain sulfur content of less than about 0.00004 lb. of sulfur per cubic foot of gas using Merriam et al.'s process. Apparently, it is not possible to obtain liquid/vapor equilibrium for the sulfur in the second step of Merriam et al.'s process, regardless how thoroughly the gas stream and the liquid sulfur are contacted. Additionally, cooling of the gas stream obtained from the second step of Merriam et al.'s process using efficient heat exchange means failed to reduce its content of vaporous elemental sulfur even though the cooled gas stream was supersaturated with respect to sulfur vapor. That vapor would not condense.

Gaseous sulfur dioxide obtained by the process of Merriam et al., while suitable for most applications wherein a sulfur dioxide-containing gas stream of high purity is required, is not suitable for making sodium sulfite, photographic grade, meeting the requirements of the American Standards Specifications, published by the American National Standard Institute (ANSI). That standard permits a maximum amount of thiosulfate, expressed as $S_2O_3$, of 0.04% based on sodium sulfite, anhydrous. Sodium sulfite is usually made by reaction of a sulfur dioxide-containing gas stream with an aqueous solution of sodium carbonate or hydroxide. Our calculations have shown, and practical experience has verified calculations, that using sulfur dioxide-containing gas obtained by the process of Merriam et al. containing about 0.0002 lb. of sulfur per cubic foot of gas, measured at standard conditions, the amount of thiosulfate in the sodium sulfite would be about 1.5% by weight, based on the sodium sulfite, anhydrous, which is many times the maximum allowable thiosulfate content established by the American National Standards Institute for sodium sulfite, anhydrous, photographic grade. We have further estimated that maximum permissible sulfur content in sulfur dioxide-containing gas suitable for making sodium sulfite meeting above-stated ANSI thiosulfate specifications is in the order of about 0.000007 lb. of sulfur per cubic foot of gas measured at standard conditions, varying somewhat with sulfur dioxide content of the gas stream. The process of Merriam et al. is incapable of producing a sulfur dioxide-containing gas stream of such low sulfur content.

We have found that if the sulfur dioxide-containing gas stream obtained by the process of Merriam et al. is further subjected to scrubbing by contacting it in a confined area with water or an aqueous medium under conditions of turbulent flow, then its sulfur content is further reduced to level below about 0.0002 lb. of sulfur per cubic foot of gas, measured at standard conditions, and to levels sufficiently low to make it suitable for making sodium sulfite, anhydrous, meeting ANSI specifications for sodium sulfite, anhydrous, photographic grade. We have found that dynamic gas liquid contacting means (dynamic liquid/gas scrubbers) permitting contacting that gas stream with water or an aqueous medium in a confined area under conditions of turbulent flow are required in order to obtain the beneficial result of the present invention. If that gas stream is contacted in a scrubbing system under conditions of non-turbulent flow, e.g., in a packed tower or by bubbling it through water, then either the beneficial result, i.e., reduction of elemental sulfur content, is not accomplished or else, if some elemental sulfur is scrubbed from the gas stream, then that sulfur tends to deposit in such manner as to plug the system in short order and to render it inoperable.

Turbulent flow, as used in the specification and claims, is defined in accordance with conventional usage in terms of the Reynolds number which, for gas of constant density and viscosity, is a factor of average linear gas velocity and conduit diameter. For purposes of the present invention, conditions of conduit diameter and average linear gas velocity which are required in order to produce a Reynolds number of above about 2,500 are defined as turbulent flow. Preferred conditions of turbulent flow are represented by Reynolds numbers of between about 10,000 and 5,000,000 more preferably between about 500,000 and 2,000,000.

Suitable dynamic liquid/gas scrubbers are described in standard handbooks on Chemical Engineering, e.g. Perry's CHEMICAL ENGINEER'S HANDBOOK. In most preferred operation, the confined area wherein the gas stream and the water or aqueous medium are contacted under conditions of turbulent flow is a venturi scrubber. Suitable venturi scrubbers are commercially available from several suppliers.

A concrete embodiment of the invention is represented by the drawing which shows, in diagrammatic view, typical apparatus employed in carrying out our invention. With reference to the drawing, air is compressed in blower 1 and introduced via dip tubes 2 and 3 into a pool of molten sulfur 5 in sulfur dioxide generator 4. Temperature of the sulfur in sulfur dioxide generator 4 is between about 550° F. and desirably below its boiling point of about 832° F. Dip tubes 2 and 3 desirably extend about 5 to 50 inches, preferably 10 to 30 inches, below the surface of the liquid pool of molten sulfur 5. The oxygen in the air combines with the sulfur to form sulfur dioxide to obtain a sulfur dioxide-containing gas heavily laden with sulfur vapor. Heat of reaction is partially absorbed by the incoming gases and partially dissipated by evaporation of liquid sulfur. If desired. pool of molten sulfur 5 may be cooled, as by externally located heat exchange means (not shown).

Sulfur laden gas from sulfur dioxide generator 4 is desirably cooled prior to any further treatment. To that end, it is routed through duct 6 to double pass gas cooler 7. While any means suitable for cooling the gas from sulfur dioxide generator 4 may be employed, single pass or double pass indirect heat exchangers, of shell and tube type wherein the gas passes inside the tubes to give higher heat transfer co-efficient, are preferred. Temperature of the heat exchange medium on the shell side of the heat exchanger is chosen so as to keep the sulfur film which condenses on the inside of the tube above the freezing point of the sulfur (above about 240° F.) but below the autoignition temperature of the sulfur, preferably below about 310° F. The gas stream exiting the heat exchanger will have about the same temperature as the sulfur condensed therein. Any heat exchange medium may be employed for that purpose. We prefer use of liquid media, especially water which is controlled at pressures from about 10 psi to 50 psi by means of throttle valve 8. Sulfur condensing in the first pass of double pass gas cooler 7 drains back into sulfur dioxide generator 4, and sulfur condensing in the second pass drains through duct 9 to sulfur equilibrator 12.

From gas cooler 7 the gas is passed via duct 9 to sulfur equilibrator 10 containing pool of molten sulfur 11 maintained at temperature between about 240° F. and about 31 ° F., preferably between about 240° F. and 300° F. but in any event desirably at temperature not above that of the incoming gas. In sulfur equilibrator 10 major portions of the super cooled sulfur held in suspension in the gas stream coming from gas cooler 7 are removed. By use of the term "equilibrator" we do not mean to imply that complete vapor pressure equilibrium between the sulfur in liquid and gas phase is established within the equilibrator. Indeed, we have found that it is impossible to establish such equilibrium within the equilibrator because of the gaseous sulfur's tendency to supersaturate in the sulfur dioxide-containing gas stream. Nevertheless, the equilibrator is a convenient means for reducing the bulk of the sulfur content of the sulfur dioxide-containing gas to very low levels down to about 0.0002 lb. of sulfur per cubic foot of gas, measured at standard conditions, which, however, is still well above the equilibrium sulfur vapor pressure at about 240° F. corresponding to about 0.000025 lb. of sulfur per cubic foot of gas, measured at standard conditions. Gas is introduced into pool of molten sulfur 11 in sulfur equilibrator 10 by means of sparger pipe 12, desirably located at least about 8 inches below the top surface of pool of molten sulfur 11, preferably about 8 to 16 inches below the top surface. In order to obtain intimate gas/liquid contact, sparger pipe 12 is provided with a plurality of apertures through which the gas is dispersed into pool of molten sulfur 11. Sulfur extracted from the gas stream in sulfur equilibrator 10 may be returned to sulfur dioxide generator 4 by means of liquid sulfur overflow line 14, which is provided with a lute to prevent flow of gas from sulfur dioxide generator 4 directly into the vapor space of equilibrator 10 by-passing both gas cooler 7 and equilibrator 10.

Gas from sulfur equilibrator 10 is passed through duct 13 into venturi scrubber 14 wherein it is contacted with scrubbing liquid circulated from scrubbing liquid pump tank 16 by means of pump 17 through scrubbing liquid circulating line 18 to venturi scrubber 15. In venturi scrubber 15, the sulfur dioxide-containing gas now low in oxygen and elemental sulfur is contacted under conditions of turbulent flow in a confined area with the scrubbing liquid, which is water or an aqueous medium. In the venturi scrubber, residual amounts of sulfur in the gas coming from sulfur equilibrator 10 are substantially removed and collected in the scrubbing liquid. If the sulfur is insoluble in or unreactive with the scrubbing liquid, then the sulfur is collected therein in finely divided particulate form and may be removed from the scrubbing liquid by filtration in a filter (not shown). However, it is also possible to use a scrubbing liquid which dissolves or reacts with the sulfur, e.g., sodium sulfite solution wherein the sulfur reacts to form thiosulfate.

Sulfur dioxide-containing product gas withdrawn through product gas duct 19 contains less than about 0.0002, usually less than about 0.0001 lb. of sulfur per cubic foot of gas, measured at standard conditions.

The scrubbing liquid employed for contacting the gas stream from the sulfur equilibrator in a confined area under conditions of turbulent flow may be water or any aqueous medium. However, we have found that on occasion the sulfur collected in the scrubbing liquid has a tendency to supercool and is then collected in liquid form, and tends to plate out on the equipment. We have now made the surprising discovery that this difficulty can be avoided, and such tendency to super-cool can be overcome, by using as scrubbing liquid water or aqueous media containing small amounts of ammonium ion, for example, from about 0.1 to 10%, preferably 0.5 to 2% by weight of ammonium ion. Generally, addition of ammonia to the aqueous scrubbing liquid, say about 0.2 to about 15%, preferably about 1 to about 3%, by weight, or addition of ammonium sulfite, say about 1 to about 40%, preferably about 3 to about 10% by weight will prevent super-cooling of the collected sulfur with its attendant difficulties, and will quite generally improve the effectiveness of sulfur removal in the scrubbing step. Further exemplary aqueous media suitable for use in the scrubbing operation include solutions of salts, such as solutions of calcium chloride, sodium chloride, sodium and ammonium sulfite, etc. If sulfite solutions are used as scrubbing medium, they may be used directly as feedstock for manufacture of the respective thiosulfate without any further treatment.

The following examples further illustrate the improvement of the present invention and set forth the best mode presently contemplated for practicing it.

EXAMPLE 1

Apparatus employed was as illustrated in the drawing. The temperature of pool of molten sulfur 5 in sulfur dioxide generator 4 was 738° F. Air was fed to sulfur dioxide generator 4 at feed rate of 0.20 cubic feet per minute through dip tube extending about 2 inches into the pool of molten sulfur. The sulfur laden sulfur dioxide gas stream generated in sulfur dioxide generator 4 was cooled in double pass gas cooler 7 to temperature of about 260° F., and was introduced into sulfur equilibrator 10 containing pool of molten sulfur 11 at temperature of 252° F. Pool of molten sulfur 11 in sulfur equilibrator 10 was about 16 inches deep, and the sulfur dioxide-containing gas stream was introduced near the bottom thereof. From sulfur equilibrator 10 the gas stream was passed through a venturi scrubber using water as scrubbing fluid, from whence it was passed through a bubbler containing deionized water at room temperature via a dip tube at about 8 inch depth. From the amount of sulfur collected in the scrubbing fluid it was estimated that the sulfur dioxide-containing gas stream fed to the venturi scrubber contained about 0.0001 pound of sulfur per cubic foot. The gas exiting the venturi scrubber contained no detectable sulfur, with limit of detectability by our method at $1 \times 10^{-7}$ lb. of sulfur per cubic foot of gas, measured at standard conditions.

EXAMPLE 2

In apparatus similar to that illustrated by the drawing, air was introduced into sulfur dioxide generator 4 at a rate of 650 cubic feet per minute. Pool of molten sulfur 5 in sulfur dioxide generator 4 was at about 730° F. Gas exiting from sulfur dioxide generator 4 was passed through a single pass gas cooler which was a vertically arranged shell and tube heat exchanger. The bulk of the sulfur evaporated in sulfur dioxide generator 4 was condensed in the gas cooler and returned by gravity to sulfur dioxide generator 4. The liquid coolant employed on the shell side of the gas cooler was water, the temperature of which was controlled at 255° F. by regulating the pressure of the water in the shell at 18 psig. Cooled sulfur dioxide-containing gas from the gas cooler was bubbled through sulfur equilibrator 10 having pool of molten sulfur 11 of 16 inch depth, maintained at temperature of 280° F. The sulfur dioxide-containing gas exiting from sulfur equilibrator 10 contained about 0.0002 lb. of sulfur per cubic foot of gas, measured at standard conditions. The sulfur dioxide-containing gas from sulfur equilibrator 10 was passed into a venturi scrubber wherein it was contacted under conditions of turbulent flow with an aqueous solution of ammonium bisulfite containing about 5% by weight of ammonium bisulfite. The scrubbed sulfur dioxide-containing product gas was used in the manufacture of sodium bisulfite which was then transformed into anhydrous sodium metabisulfite which contained less than 0.02% by weight of thiosulfate, expressed as $S_2O_3$, fully meeting the requirements of the American Standards Specifications published by the American National Standards Institute for sodium metabisulfite, anhydrous, photographic grade.

It is a further advantage of our process that it provides a sulfur dioxide-containing gas stream that is not only exceptionally low in elemental sulfur, but that additionally is also exceptionally low in sulfur trioxide, which is of considerable importance, e.g. in the event the gas stream is to be used for making a sulfite salt, in which event sulfur trioxide contained in the gas stream would result in undesirable visible gas emission from the gassing step wherein a carbonate or hydroxide solution is contacted with the sulfur dioxide-containing gas.

While in the above description and examples we referred to air as the means for making the sulfur dioxide-containing gas stream, any oxygen-containing gas may be substituted therefor, as for example, commercial oxygen or oxygen-enriched air.

Since various changes may be made in carrying out the process of our invention without departing from its scope and essential characteristics, it is intended that all matter contained in the above description shall be interpreted as illustrative only, the invention being limited solely by the appended claims.

We claim:

1. In the method for generating a sulfur dioxide-containing gas stream of low elemental sulfur content involving the steps of contacting a stream of oxygen-containing gas with elemental sulfur maintained at temperature of at least about 500° F. to generate a gas stream comprising sulfur dioxide and gaseous elemental sulfur, followed by contacting said gas stream with elemental sulfur maintained at temperature of from about 240° F. to 310° F. to obtain a gas stream low in oxygen and elemental sulfur, the improvement which comprises:

contacting said gas stream low in oxygen and elemental sulfur in a venturi scrubber with water or an aqueous medium containing about 0.1 to about 10% by weight of ammonium ion under conditions of turbulent flow and recovering a sulfur dioxide-containing gas stream substantially free of oxygen and sulfur trioxide and containing less than about 0.0002 lb. of elemental sulfur per cubic foot of gas, measured at standard conditions.

2. The improvement of claim 1 further comprising first cooling the gas stream comprising sulfur dioxide and gaseous elemental sulfur by indirect heat exchange to a temperature of between about 240° and about 310° F., and then contacting it with elemental sulfur maintained at temperature of from about 240° to 310° F., but not above that of the cooled gas stream.

3. The improvement of claim 1 wherein the aqueous medium with which the gas stream is contacted in the venturi scrubber is an aqueous solution of sodium sulfite.

4. The improvement of claim 1 further comprising first cooling the gas stream comprising sulfur dioxide and gaseous elemental sulfur by indirect heat exchange to temperature of between about 240° and about 310° F., and then contacting it with elemental sulfur maintained at temperature of from about 240° to 310° F., but not above that of the cooled gas stream, and wherein the aqueous medium with which the gas stream is contacted under conditions of turbulent flow is an aqueous solution of sodium sulfite.

* * * * *